United States Patent
Lewis

(10) Patent No.: US 9,981,385 B2
(45) Date of Patent: May 29, 2018

(54) DYNAMIC AUTOMATION WORK ZONE SAFETY SYSTEM

(71) Applicant: The Boeing Company, Chicago, IL (US)

(72) Inventor: Melissa H. Lewis, Auburn, WA (US)

(73) Assignee: The Boeing Company, Chicago, IL (US)

( * ) Notice: Subject to any disclaimer, the term of this patent is extended or adjusted under 35 U.S.C. 154(b) by 116 days.

(21) Appl. No.: 14/881,064

(22) Filed: Oct. 12, 2015

(65) Prior Publication Data
US 2017/0100838 A1    Apr. 13, 2017

(51) Int. Cl.
*G05B 19/18* (2006.01)
*B25J 9/16* (2006.01)

(52) U.S. Cl.
CPC ... *B25J 9/1676* (2013.01); *G05B 2219/40202* (2013.01); *G05B 2219/40203* (2013.01); *G05B 2219/49141* (2013.01)

(58) Field of Classification Search
CPC ......... B25J 9/1676; G05B 2219/40202; G05B 2219/49141
See application file for complete search history.

(56) References Cited

U.S. PATENT DOCUMENTS

| | | | | |
|---|---|---|---|---|
| 7,915,841 B2 * | 3/2011 | Griessnig | ................. | H04Q 9/00 235/472.02 |
| 8,125,313 B2 * | 2/2012 | Griessnig | ............. | G05B 19/409 340/10.4 |
| 2001/0035729 A1 * | 11/2001 | Graiger | ................ | H04B 5/0043 318/587 |
| 2004/0030531 A1 * | 2/2004 | Miller | .................. | A61B 5/0002 702/182 |
| 2005/0021158 A1 * | 1/2005 | De Meyer | .............. | G08C 19/28 700/23 |
| 2005/0273200 A1 * | 12/2005 | Hietmann | .............. | B25J 9/1666 700/248 |
| 2006/0108960 A1 * | 5/2006 | Tanaka | ................... | B25J 9/1676 318/568.21 |
| 2007/0297890 A1 * | 12/2007 | Sjoberg | ................. | B25J 13/065 414/735 |

(Continued)

OTHER PUBLICATIONS

Safety for Human-Robot Interaction, Danica Kulic, The University of British Columbia; Dec. 2005.*

*Primary Examiner* — Ian Jen
(74) *Attorney, Agent, or Firm* — McDonnell Boehnen Hulbert & Berghoff LLP

(57) ABSTRACT

Methods and apparatus are provided for operating robotic actors in a human/robotic environment. A safety controller that is configured to communicate with one or more robotic actors can receive actor information about at least a location of one or more actors. The safety controller can receive robot information comprising at least a location of a particular robotic actor of the one or more robotic actors. The safety controller can determine a command for controlling operation of the particular robotic actor of the one or more robotic actors by applying one or more safety criteria to the actor information and the robot information. The safety controller can generate an output including the command for controlling operation of the particular robotic actor.

20 Claims, 8 Drawing Sheets

(56) References Cited

U.S. PATENT DOCUMENTS

| | | | |
|---|---|---|---|
| 2008/0125908 A1* | 5/2008 | Sjoberg | B25J 9/1674 700/247 |
| 2009/0030550 A1* | 1/2009 | Nagata | B25J 19/06 700/251 |
| 2009/0128079 A1* | 5/2009 | Sjoberg | B25J 13/06 318/568.13 |
| 2009/0204261 A1* | 8/2009 | Strand | B25J 9/1656 700/264 |
| 2010/0127824 A1* | 5/2010 | Moschl | G05B 19/4184 340/5.65 |
| 2010/0236046 A1* | 9/2010 | Lundberg | B23P 21/004 29/430 |
| 2011/0264266 A1 | 10/2011 | Kock | |
| 2011/0295399 A1 | 12/2011 | Plociennik et al. | |
| 2011/0298579 A1* | 12/2011 | Hardegger | F16P 3/14 340/3.1 |
| 2012/0085741 A1* | 4/2012 | Holverson | B23K 9/0953 219/136 |
| 2012/0245439 A1* | 9/2012 | Andre | A61B 5/0205 600/310 |
| 2013/0264319 A1* | 10/2013 | Temby | B23K 9/095 219/130.1 |
| 2014/0067121 A1 | 3/2014 | Brooks et al. | |
| 2014/0195051 A1 | 7/2014 | Bonin et al. | |
| 2014/0375461 A1* | 12/2014 | Richardson | G08B 21/0446 340/573.7 |
| 2015/0096352 A1* | 4/2015 | Peterson | G01N 27/02 73/31.02 |
| 2015/0131896 A1 | 5/2015 | Hu et al. | |
| 2015/0264028 A1* | 9/2015 | Kim | H04L 43/08 726/3 |
| 2015/0314889 A1* | 11/2015 | Day | B23B 41/00 408/1 R |
| 2016/0028264 A1* | 1/2016 | Bernhard | H02J 7/345 307/21 |
| 2016/0035204 A1* | 2/2016 | Jansen | G08B 25/016 340/573.1 |
| 2016/0045135 A1* | 2/2016 | Kim | A61B 5/6843 600/391 |
| 2016/0057599 A1* | 2/2016 | Lim | H04W 4/22 455/404.1 |
| 2016/0081625 A1* | 3/2016 | Kim | H04W 4/008 600/301 |
| 2016/0092469 A1* | 3/2016 | Mukherjee | G06F 17/30241 705/325 |
| 2016/0094700 A1* | 3/2016 | Lee | H04W 8/245 455/419 |

* cited by examiner

US 9,981,385 B2

DYNAMIC AUTOMATION WORK ZONE SAFETY SYSTEM

BACKGROUND OF THE INVENTION

Unless otherwise indicated herein, the materials described in this section are not prior art to the claims in this application and are not admitted to be prior art by inclusion in this section.

One or more robots and/or other actors, such as human actors, can move throughout an environment, such as the interior of part or all of a building and/or its surrounding outdoor regions, to perform tasks and/or otherwise utilize the space. For example, robots and human actors can be used together to manufacture complex machinery, such as automobiles, airplanes, machine tools, and even other robots. Other environments may exist where robots and human actors can be used together.

SUMMARY

In one aspect, a method is provided. A safety controller receives actor information about at least a location of one or more actors. The safety controller is configured to communicate with one or more robotic actors. The safety controller receives robot information including at least a location of a particular robotic actor of the one or more robotic actors. The safety controller determines a command for controlling operation of the particular robotic actor of the one or more robotic actors by the safety controller applying one or more safety criteria to the actor information and the robot information. The safety controller generates an output including the command for controlling operation of the particular robotic actor.

In another aspect, a computing device configured to act at least as a safety controller is provided. The computing device includes a processor and data storage. The processor is in communication with one or more robotic actors, and is configured to receive robotic information comprising at least a location of a particular robotic actor of the one or more robotic actors, and to receive actor information about at least a location of one or more actors. The data storage stores instructions that, upon execution by the processor, cause the computing device to perform safety-controller functions. The safety-controller functions include: determining a command for controlling operation of the particular robotic actor of the one or more robotic actors by applying one or more safety criteria to the actor information and the robot information; and generating an output including the command for controlling operation of the particular robotic actor.

In another aspect, an article of manufacture is provided. The article of manufacture includes a tangible computer-readable storage medium storing instructions that, upon execution by a processor of the article of manufacture, cause the article of manufacture to perform functions. The functions include: receiving actor information about at least a location of one or more actors, where the article of manufacture is configured to communicate with one or more robotic actors; receiving robot information including at least a location of a particular robotic actor of the one or more robotic actors; determining a command for controlling operation of the particular robotic actor of the one or more robotic actors by applying one or more safety criteria to the actor information and the robot information; and generating an output including the command for controlling operation of the particular robotic actor.

BRIEF DESCRIPTION OF THE DRAWINGS

Various examples of particular embodiments are described herein with reference to the following drawings, wherein like numerals denote like entities, in which.

DETAILED DESCRIPTION

Figure 1:
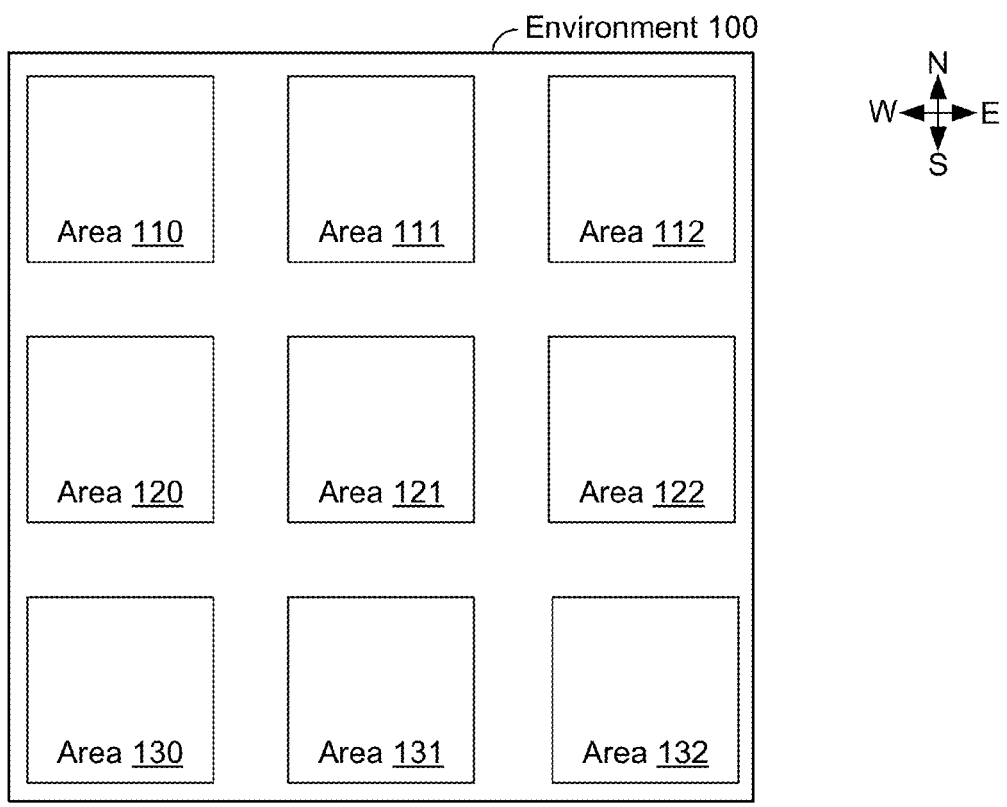
FIG. 1 shows an environment, in accordance with an example embodiment.

This disclosure relates to flexible safety systems that can evaluate potential risk to personnel operating an environment with both human and robotic actors. For example, in a research and development setting, human actors (e.g., engineers, technicians, operators) often work with and around operating robots. But, existing robotic safety features can be inflexible. For example, a "dead man's" control that has to be enabled to allow robotic operation, does not allow a human operator to work on the robot while the robot is in operation. Many dead man's controls require constant hand or finger pressure to enable robot activation, tying up use of the hand/finger of the human operator providing the pressure. Further, the amount of pressure required can be difficult for the human operator to provide, especially over a relatively-long duration; e.g., most or all of a shift working with the robot. Existing safety systems typically lack a redundancy and sophistication that would prevent a robotic actor from entering into motion while individuals are within the operating zone. Further, the existing safety systems typically do not allow for an operator to work collaboratively with the robot safely while the robot is in motion.

The herein-described techniques allow for increased safety for human actors, such as human operators of robots/robotic actors, and enable human actors to better interact with the robotic actors. A safety controller associated with one or more robots can communicate with the robot(s) and one or more mobile computing devices associated with by human actors in the environment. Examples of the mobile computing devices include, but are not limited to, smart phones, smart watches, tablets, and laptops. Then, the safety controller can use obtain information from sensors attached to the robot(s), such as kinematic information, and information with respect to the human actors, such as actor identification and kinematic information, to determine a risk mode for the robot. Kinematic information for an actor can include, but is not limited to, location, movement, speed/velocity, and acceleration information about the actor.

This risk mode for a robotic actor can indicate at least a probability that the robotic actor can cause harm to a human actor in the environment. For example, the safety controller associated with the robotic actor can determine distances and possible intersections between the robotic actor and human actors mathematically; e.g., using kinematic equations. Then, in this example, the safety controller can determine the risk mode based on the determined distances and possible intersections. In some cases, the risk mode for a robotic actor can indicate at least a probability that the robotic actor can cause harm to another actor, robotic or human, in the environment; e.g., by determining distances between and possible intersections between the robotic actor and human actors, robotic actors, and other entities/objects in the environment. Then, the safety controller can direct the robot to operate according the risk mode—if the risk mode is high, the robot can slow down or stop operation, which if the risk mode is low, the robot can maintain relatively-high speed operation.

Assessing risk modes based on information provided by mobile devices worn or carried by the human actors frees up the hands of human actors previously having to use deadman's controls or other similar hands-on safety controls. Also, in some embodiments, human actors can collaborate with operating robots in the environment. For example, if a process, such as a manufacturing process, involving use of operating robots has not been finalized, human actors can provide supervision and attention to the operating robots to adjust robotic functioning within the process, even while at least some of the operating robots are carrying out the process. Then, after the process has been finalized, human actors can provide oversight to the operating robots to maintain robotic functioning within the finalized process.

Use of a robotic safety system based on wireless communication with human actors can enable more flexible interactions robotic actors and human actors within the environment. The human actors can safely interact with robotic actors while the robotic actors are in operation Further, rapid communications between the safety controllers, robotic actors, and human actors allows a more comprehensive assessment of risk modes. That is, by receiving up-to-date information from a number of sources, the safety controller for a robotic actor can receive up-to-date kinematic and other information about multiple human and robotic actors in the environment to determine a proper risk mode that ensures consequent safe operation of the robotic actor.

Flexible Safety Systems for Robotic Actors Interacting with Human Actors

FIG. 1 shows environment 100 which include includes nine areas 110, 111, 112, 120, 121, 122, 130, 131, and 132, in accordance with an example embodiment. Environment 100 can represent an indoor space, such as a factory or manufacturing facility, and/or an outdoor space, such as an outdoor region divided into areas. Each area can be utilized by one or more human actors and/or one or more robots/robotic actors. The robots/robotic actors can be stationary or mobile devices.

Environment 100 can be utilized by human and robotic actors to perform tasks, such as but not limited to manufacturing, storing, and/or transporting articles of manufacture (e.g., machinery, electronic components, textiles). To maintain safety in environment 100 and perhaps for other reasons, some or all of the robotic actors in the environment can be configured with safety controllers. A computing device, such as computing device 420 discussed below in the context of FIG. 4B, can be configured to perform the herein-described features of a herein-described safety controller.

Figure 2A:
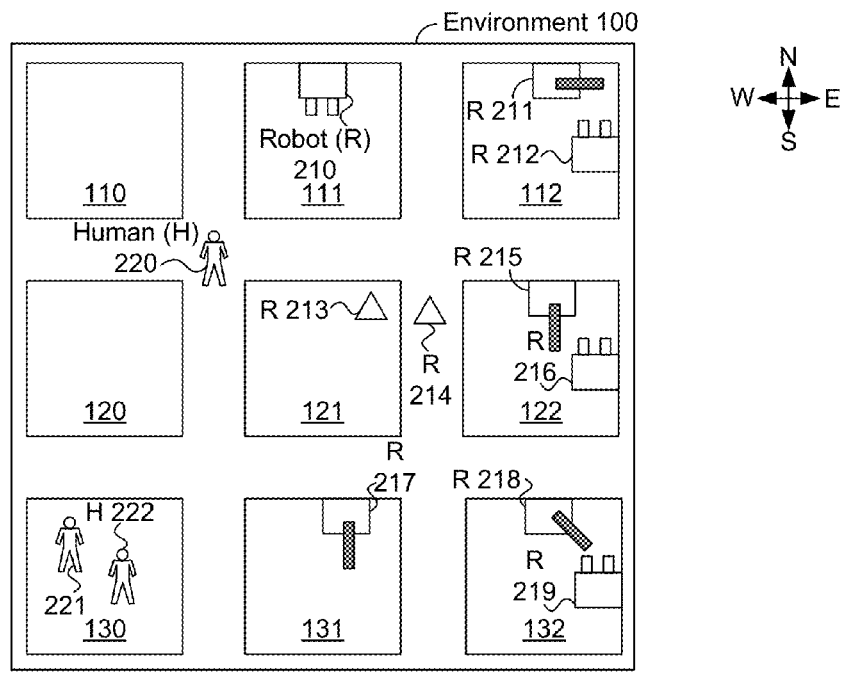
FIGS. 2A, 2B, and 2C depict a scenario that takes place in the environment depicted in FIG. 1, in accordance with an example embodiment.
Figure 2B:
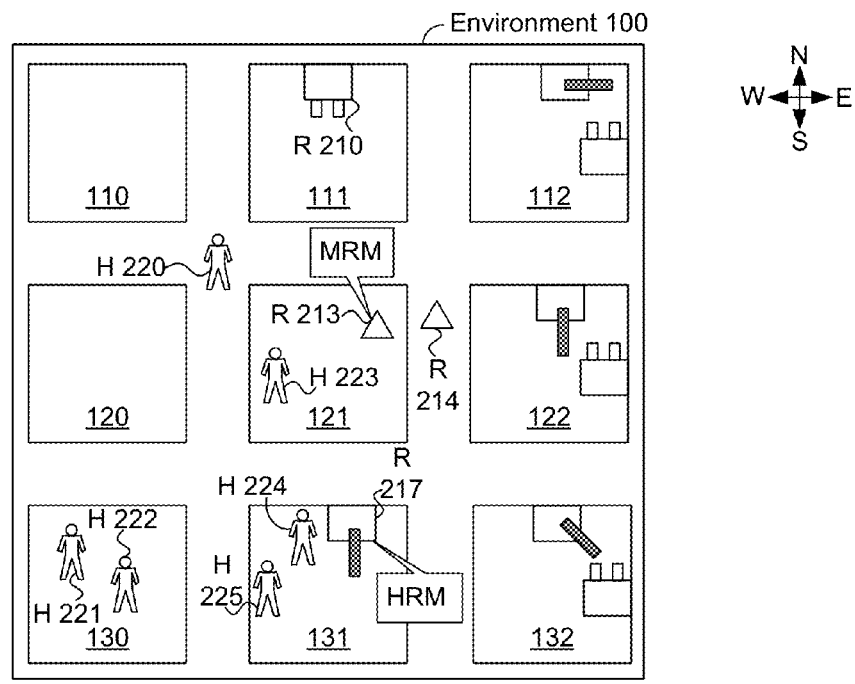
Figure 2C:
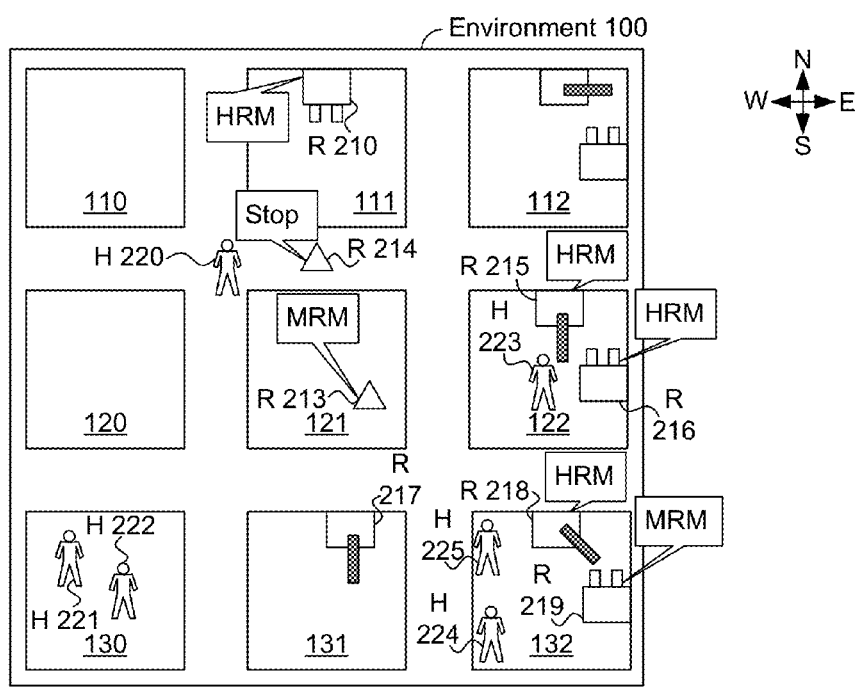

FIGS. 2A, 2B, and 2C depict a scenario 200 that takes place in the environment depicted in FIG. 1, in accordance with an example embodiment. In particular, FIG. 2A shows environment 100 at the onset of scenario 200.

Scenario 200 illustrates aspects of a system that can integrate several individual sensor systems to increase the sophistication of safety capabilities while also maximizing the collaboration opportunities between the robotic and human actors. As indicated above, the system can include one or more safety controllers associated with robotic actors. For example, each robotic actor in environment 100 can be configured with one or more hardware and/or software components specifically configured as a herein-described safety controller; i.e., the safety controller can operate independently from the robotic actor and avoid using other computational resources of the robotic actor. As another example, one or more software components executing on one or more processors and/or computing devices of a robotic actor can be configured as a herein-described safety controller, as well as performing other functionality for the robotic actor. In still other examples, one or more processors and/or computing devices can be configured to act as a herein-described safety controller for multiple robotic actors. Other relationships between safety controllers and robotic actors are possible as well.

The safety controller can be configured to obtain robot information from an associated robotic actor (or actors), human actors, and perhaps from other data sources. For example, the safety controller may include a processor that is in communication with one or more robotic actors, where the processor is configured to receive robotic information comprising at least a location of a particular robotic actor of the one or more robotic actors, and to receive actor information about at least a location of one or more actors. To obtain robot information from the robotic actor, the safety controller can poll or otherwise receive information from one or more sensors of a robotic actor; such information can include, but is not limited to, information about proximate objects/actors to the robotic actor and kinematic information about the robotic actor. Other robot information about the robotic actor can be used by the safety controller as well, such as but not limited to information identifying the robotic actor (e.g., an identification number, a serial number, an identification string or name of the robotic actor, manufacturer and model information about the robotic actor), information about capabilities of the robotic actor, tasks/roles being performed by the robotic actor, and robotic actor configuration information (e.g., size, weight, lifting, and/or other capacity information, mobility information, information about actuators of the robotic platform).

Actor information about human actors can be provided to the safety controller; e.g., via wireless (or wired) communication between the safety controller and one or more mobile computing devices (or other computing devices) carried, worn, and/or otherwise associated with one or more human actors. The actor information can include but is not limited to information identifying the human actor(s) (e.g., name(s), ID/employee number(s)), role(s)/job classification(s) of the human actor(s), information about one or more biological indicators of the human actor(s), and kinematic information about the human actor(s). The information about one or more biological indicators for a human actor can include but is not limited to information about: a heart rate of the human actor, a respiration/breathing rate of the human actor, blood pressure of the human actor, pupil dilation of the human actor, and indicator(s) related to voice/vocal stress of the human actor. In some embodiments, the mobile computing devices can include smart watches that can be worn by human actors within environment 100.

The other data sources can provide information about roles/tasks carried out by robotic and/or human actor(s), objects in environment 100, and perhaps other information (e.g., information that may be provided by a human or robotic actor, other information about environment 100). For example, a positioning system within environment 100 can provide information to the safety controller about location(s) of human actors, perhaps providing location information that is relative to the location of the robotic actor.

The safety controller can obtain information from one or more entities, such as but not limited to, associated robotic actors, other robotic actors, human actors, and other data sources, by use of one or more communications techniques. The communications techniques can include, but are not limited to, sending requests/commands to the other entities to provide the data and then subsequently obtaining the data, by polling the other entities for available data, and/or by receiving data as provided by the other entities using other communications techniques; e.g., the other entities broadcast available data without receiving a request/command from a safety controller, the other entities send reports with available data at periodic or other intervals of time. Similarly, the other entities can use some or all of the aforementioned communications techniques to obtain robot and other information from each other and/or from one or more safety controllers.

After receiving information from robotic actors, human actors, and/or other data sources, the safety controller can apply one or more safety criteria to the received information for the associated robotic actor, and then send appropriate commands to the associated robotic actor by generating an output including a command for controlling the operation of a particular robotic actor. For example, if the safety controller determines that a dangerous or risky situation is occurring or will soon occur, the safety controller can send one or more commands to the robotic actor to slow down, stop immediately, or perhaps take some other action, such as produce one or more audible and/or visual warning signals or stop some or all components (e.g., actuators such as moving arms or other components) of the robotic actor. The command may comprise one or more of a command to switch the particular robotic actor into a particular safety mode, a command to start the particular robotic actor, a command to stop the particular robotic actor, a command to reduce a speed of the particular robotic actor, a command to increase the speed of the particular robotic actor, and a command to change a direction of movement of at least a portion of the particular robotic actor. For example, a command to stop may comprise a deactivation command for deactivating the particular robotic actor, and a command to reduced speed may comprise a minimum speed command to control operation of the robotic actor at a minimal speed. These commands can reduce or perhaps eliminate the danger/risk in the situation, and thus make environment 100 safer.

In some cases, a command can indicate a mode, such as a safety mode or risk mode, to the robotic actor. For example, if the safety controller determines that a dangerous or risky situation is occurring or will soon occur, then the safety controller can send a command to the robotic actor to enter into a high-safety or high-risk mode. Then, the robotic actor can take actions based on the high-safety/high-risk mode; e.g., make an (emergency) stop, slow down, provide warning signals. In another example, if the safety controller determines that a moderately dangerous or risky situation is occurring or will soon occur, then the safety controller can send commands to reduce and/or eliminate danger/risk in environment 100; e.g., commands to slow down the robotic actor, change direction of a mobile robotic actor, change a role/task of the robotic actor, and/or stop the robotic actor. In this same example, the safety controller can send a command to the robotic actor to switch into a medium-safety or medium-risk mode and the robotic actor can take actions based on the medium-safety/medium-risk mode; e.g., slow down, change direction, change roles/tasks, and/or stop. In a third example, if the safety controller determines that a dangerous or risky situation is (very) unlikely to occur, the safety controller can send a command to the robotic actor to enter into a low-safety/low-risk mode. Then, the robotic actor can take actions based on the low-safety/low-risk mode; e.g., operate at a maximum allowable speed, begin/continue to perform relatively-risky roles/tasks. In some embodiments, a default mode for the robotic actor can be designated; e.g., a low-safety/low-risk mode.

In other embodiments, commands sent from the safety controller to the robotic actor can be sent to other entities as well. For example, a safety controller can send a copy of a command Cmd1 sent to a particular robotic actor Robot1 to enter into a high-safety mode to a mobile computing device worn/carried by a human actor Person1 that is relatively close to Robot1. Upon reception of command Cmd1, the mobile computing device can change a display, generate an audible alarm, and/or otherwise indicate that Robot1 is now in the high-safety mode, thus informing Person1 of the status of Robot1. Many other examples are commands sent from the safety controller to other entities are possible as well; e.g., safety controllers can broadcast commands so that any entity capable of receiving the commands can receive and process them.

In some examples, safety controllers can share commands, and perhaps other information, to better inform robotic and human actors in environment 100 in order to make environment 100 safer. Continuing the above example, a safety controller SC1 for Robot1 can send kinematic, identification, and perhaps other information about Person1 to a relatively-near robotic actor Robot2. Then, a safety controller SC2 for Robot2 can receive the information from SC1, either directly or indirectly via Robot2, and use the information from SC1 to update risk/safety modes for Robot2.

The safety controller can apply safety criteria to assess received information and determine appropriate risk/safety modes. The safety criteria can be based on kinematic information. The safety controller can determine a difference between the actor position and the robotic position, and determine whether the difference is less than a medium-risk threshold, and whether the difference is less than a high-risk threshold. For example, a safety criterion can indicate that a situation is a high-risk/high-safety situation when a location of a robotic actor is within a high-safety threshold distance of a human actor; e.g., when the robotic actor is within 1 meter, 10 feet, or some other distance of the human actor. As another location based example, a safety criterion can indicate that a situation is a medium-risk/medium-safety situation when a location of a robotic actor outside of the high-safety threshold distance of a human actor, but is within a medium-safety threshold distance of the human actor; e.g., between 1 meter (the high-safety threshold) and 10 meters (a medium-safety threshold). Where the safety controller determines that a difference between the actor position and the robotic position is less than a high-risk threshold, the safety controller can generate an output including a command for controlling the operation of the particular robotic actor to switch the particular robotic actor into a particular safety mode, for example, which may cause the robotic actor to stop.

The safety controller can use the kinematic information to predict location(s) of actor(s) and apply safety criteria based on the predicted locations and/or predicted times of possible collisions. For example, suppose that the safety controller receives kinematic information indicating that, if a robotic actor and a human actor continue on current respective trajectories, then the robotic actor and the human actor will collide within a high-safety threshold time (e.g., 1 second, 5 seconds) and/or come within the high-safety threshold distance within the high-safety threshold time. In this example, the safety controller can make the predicted locations and/or predicted times of possible collisions, using the kinematic equations and/or other mathematical techniques for prediction locations of actors using kinematic information.

Then, based on these predicted locations and/or predicted times of possible collisions, the safety controller can indicate that the situation is a high-risk/high-safety situation. As another example, suppose that the safety controller receives kinematic information indicating that, if a robotic actor and a human actor continue on current respective trajectories, then the robotic actor and the human actor will collide after the high-safety threshold time but within a medium-safety threshold time (e.g., between 1 and 10 seconds) and/or come within the medium-safety threshold distance within a predetermined time, such as the high-safety threshold time. Then, based on these predicted locations and/or predicted times of possible collisions, the safety controller can indicate that the situation is a medium-risk/medium-safety situation. Other techniques than using the kinematic equations for predicting locations of/collisions between actors are possible as well; e.g., if role/task information indicates that an actor is supposed to be moving toward a particular location, and the kinematic information indicates that the actor is indeed moving toward the particular location, then the actor can be predicted to move toward the particular location, perhaps while changing trajectories along the way to the predicted location.

In some examples, safety criteria can include criteria related to a role or task performed by a robotic actor or human actor. For example, suppose a robotic actor Robot HiRisk has a role involving transporting potentially dangerous materials (e.g., fuel, chemical, waste). Then, the safety criteria can change threshold values and/or otherwise indicate that additional safety is required when operating around Robot HiRisk and/or while Robot HiRisk has a task involving transporting the potentially dangerous materials. As another example, suppose a human actor Welder has a role as a welder, and thus is frequently near high-heat sources. Then, the safety criteria can indicate that a robotic or human actor transporting potentially dangerous materials is operate in a high-safety mode and/or send commands to a robotic actor transporting potentially dangerous materials related to the high-safety mode when within an ultra-high-risk distance of a human or robotic actor with a role involving use of high-heat sources; e.g., Robot HiRisk would be instructed to enter in the high-safety mode when within the ultra-high-risk distance of Welder.

In other examples, safety criteria can include criteria related to a stress level of a human actor. Suppose that a human actor Nervous is wearing a smart watch within environment 100 that is configured to determine and communicate heart rate information about Nervous while within environment 100. In this example, Nervous has provided information; e.g., using a user interface for a robot safety profile such as shown in FIG. 3D, indicating that Nervous is in a high-stress situation when Nervous has a heart rate above a high-stress threshold value of 160 beats/minute. Further, suppose that Nervous sees Robot HiRisk carrying potentially dangerous materials and that Nervous and Robot HiRisk area well outside a high-safety threshold distance. However, upon seeing Robot HiRisk, Nervous's heart rate quickly rises above the high-stress threshold value of 160 beats/minute. Then, the smart watch can send information to the safety controller for Robot HiRisk indicating that Nervous is at a high-stress level. Upon receiving this information about Nervous's high-stress level, the safety controller can send Robot HiRisk a command to act in a high-safety mode, a command to act in a highly safe fashion; e.g., make an emergency stop, and/or a command to reduce Nervous's high-stress level; e.g., move in a direction away from Nervous.

Combinations of these safety criteria are possible as well. Further, other classifications of situations than high, medium, and low risk or safety by safety criteria as well; for example, numerical classifications of risk/safety can be determined by application of safety criteria to received information; or more, fewer, and/or different categorical classifications than high, medium, and low risk; i.e., a color-coded set of risk/safety classifications with red=high risk/safety, yellow=medium risk/safety, and green=low risk/safety can be determined by application of safety criteria to received information.

Once the information has been processed by the safety controller and appropriate commands generated and sent from the safety controller to the robotic actor, then the safety controller can obtain additional information, apply safety criteria to the additional information to update risk/safety mode(s) for the robotic actor, and send appropriate commands to the robotic device and perhaps other entities.

FIG. 2A shows that, at an onset of scenario 200, environment 100 includes robotic actors/robots 210, 211, 212, 213, 214, 215, 216, 217, 218, 219, and human actors/humans 220, 221, 222, 223. In FIGS. 2A-2C, robotic actors are shown labeled with the letter "R"; e.g., R 211 is robotic actor 211 in area 112 in a north-eastern corner of environment 100 and humans are shown labeled with the letter "H"; e.g., H 220 is human actor in a corridor near area 110 in a north-western corner of environment 100. FIG. 2A shows that robotic actor 210, which is a static Type 1 robot, is in area 111; robotic actors 211 and 212, which are respective moving-arm Type 2 and Type 1 robots, are in area 112; robotic actor 213, which is a mobile Type 3 robot, is in area 121; Type 3 robotic actor 214 is in a corridor between areas 121 and 122, Type 2 robotic actor 215 and Type 1 robotic actor 216 are in area 122; Type 2 robotic actor 217 is in area 131, and Type 2 robotic actor 218 and Type 1 robotic actor 219 are in area 122. FIG. 2A also shows that human actor 220 is near area 110, and that human actors 221, 222 are both in area 130.

During scenario 200, each robotic actor is configured to communicate with a safety controller, and each human actor is carrying, wearing, or is otherwise associated with a (mobile) computing device; e.g., each human actor is wearing a smart watch. The mobile computing devices can be configured to communicate with the safety controllers via a wireless communications protocol; e.g., a Bluetooth® protocol, an IEEE 802.11 protocol, such as but not limited to IEEE 802.11a, IEEE 802.11b, IEEE 802.11g, and/or IEEE 802.11n, a wireless wide-area network (WWAN) protocol, such as a 3G, 4G, EV-DO, CDMA, TDMA, GSM or other WWAN protocol. Using wireless communications, the mobile computing devices and safety controllers can share information, such as actor information sent from the mobile computing devices to the safety controllers, and information about robotic devices sent from the safety controllers to the mobile computing devices. The safety controllers can also be configured to receive robot information from the robotic actors. For example, the safety controllers may be configured to receive the actor information via a wireless communication interface coupled to the safety controller. Using these communication techniques, and perhaps others, the human actors and robotic actors can continuously share actor, robot, and/or other information throughout scenario 200.

In scenario 200 and as indicated in FIG. 2A, a mobile computing device associated with human actor 220 can wirelessly communicate with safety controllers associated with at least nearby robotic actors 210 and 213 using the above-mentioned communication; e.g., using a short-range wireless protocol such as a Bluetooth protocol. In scenario 200 and as indicated in FIG. 2A, mobile computing devices associated with human actors 221, 222 are out of range to have (short-range) wireless communications with a nearest robotic actor 217. In the portion of scenario 200 depicted in FIG. 2A, all of the robotic actors are in a low-safety mode. In particular, safety controllers associated with respective robotic actors 210 and 213 can apply safety criteria, such as discussed above, to actor information; e.g., kinematic information, received from (or on behalf of) human actor 220, and perhaps other information, and respectively determine that respective robotic actors 210 and 213 can each operate in a low-risk mode.

Scenario 200 continues with additional human actors 223, 224, 225 becoming present in environment 100 as shown in FIG. 2B. Specifically, FIG. 2B shows that human actors 220, 221, and 222 are in the same locations as indicated above in the context of FIG. 2A, while human actor 223 is present in area 121 and human actors 224, 225 are present in area 131. FIG. 2B also indicates that robotic actors 210, 211, 212, 215, 216, 217, 218, and 219 are in the same locations as indicated above in the context of FIG. 2A, while mobile robotic actor 213 has moved a short distance within area 121 and mobile robotic actor 214 has moved a short distance within a corridor between areas 121 and 122.

At the stage of scenario 200 shown in FIG. 2B, the safety controllers for respective robotic actors 210-219 have determined respective risk modes for robotic actors 210-219. In scenario 200, four risk modes are used by the safety controllers: a high-risk mode (HRM), a medium-risk mode (MRM), a low-risk mode (LRM), and an emergency stop mode. In scenario 200, a safety controller for a particular robotic actor of robotic actors 210-219 can determine whether the particular robotic actor is in a high-risk mode, medium-risk mode, and low-risk modes by applying safety criteria applied to actor, robot, and perhaps other information received by the safety controller as discussed above in the context of FIG. 2A. A safety controller for the particular robotic actor can determine that the particular robotic actor is in the emergency stop mode when the safety controller receives a request, command, or other communication to (nearly) immediately stop the particular robotic controller. In other scenarios, the emergency stop mode is not distinct from the high-risk mode; i.e., a robotic actor is (nearly) immediately stopped upon entry into the high-risk mode.

In scenario 200, a default risk mode for a robotic actor/ associated safety controller is the low-risk mode. As indicated above, the robotic actors and associated safety controllers shown in FIG. 2A are all in the low-risk mode. As best shown in FIGS. 2B and 2C, robotic actors/associated safety controllers in a mode other than the default low-risk mode are indicated using word balloons. For example, FIG. 2B indicates robotic actor 213 is in the medium-risk mode using a word balloon with text of "MRM" touching robotic actor 213 and indicates robotic actor 217 is in the high-risk mode using a word balloon with text of "HRM" touching robotic actor 217. As another example, FIG. 2B indicates, by the absence of word balloons, that each of robotic actors 210, 211, 212, 214, 215, 216, 218, 219, and 220 are in the default low-risk mode.

A safety controller associated with mobile robotic actor 213 can receive actor information from at least human actor 223 and robot information from robotic actor 213, and apply safety criteria based on a prediction indicating that a location of human actor 223 can be reached in a relatively-short time if mobile robotic actor 213 moves toward human actor 223. As such, the safety controller associated with mobile robotic actor 213 can indicate that mobile robotic actor 213 is a medium risk-mode. While in the medium-risk mode and/or via other techniques, the safety controller associated with mobile robotic actor 213 can stop, slow and/or constrain motion of mobile robotic actor 213 in directions toward human actor 223; e.g., mobile robotic actor 213 can be constrained from moving in a southerly, south westerly, and/or westerly direction toward human actor 223 and/or can be slowed or stopped from moving.

A safety controller associated with robotic actor 217 can receive actor information from at least human actors 224, 225 and robot information from robotic actor 217, and apply safety criteria based on a prediction indicating that at least a portion, such as a moving arm or perhaps another mobile actuator/portion, of robotic actor 217 could come close to or contact a human actor; e.g., human actor 224. As such, the safety controller associated with robotic actor 217 can indicate that robotic actor 217 is a high risk-mode. While in the high-risk mode and/or via other techniques, the safety controller associated with robotic actor 217 can stop, slow and/or constrain motion of the arm of robotic actor 217 in directions toward human actor 224 and perhaps human actor 225. Also, while in the high-risk mode, a role and/or task of robotic actor 217 can change; e.g. if the arm of robotic actor 217 was moving an object that would effectively extend the length of the arm, then robotic actor 217 may change its role and/or task to not move the object while in the high-risk mode.

Scenario 200 continues with actors moving around in environment 100 as shown in FIG. 2C. Regarding robotic actors, FIG. 2C shows, in comparison to the context shown by FIG. 2B, that mobile robotic actor 213 has moved southward within area 121, mobile robotic actor 214 has moved to a corridor between areas 111 and 121, and robotic actors 210, 211, 212, 215, 216, 217, 218, and 219 are in the same locations. Regarding human actors, FIG. 2C shows, in comparison to the context shown by FIG. 2B, that: human actor 220 has moved to be near the corridor between areas 111 and 121, human actors 221 and 222 remain in area 130, human actor 223 has moved to area 122, which was already occupied by robotic actors 215 and 216, and human actors 224 and 225 have moved to area 132, which were already occupied by robotic actors 218 and 219.

At the stage of scenario 200 shown in FIG. 2C, human actor 220 has communicated actor information with a command to the safety controller associated with robotic actor 214 to direct robotic actor 214 make an emergency stop (i.e., make an immediate stop). In scenario 200, human actor 220 is wearing a smart watch and presses a button on the smart watch to send the command for the emergency stop to the safety controller associated with robotic actor 214. In related scenarios, the smart watch can monitor one or more biological indicators of human actor 220; e.g., a heart rate and/or a pulse rate, determine that the biological indicator(s) indicate that human actor 220 is at a high-stress level, as discussed above at least in the context of FIG. 2A. Then, in response to determining that human actor 220 is at the high-stress level, the smart watch can generate the command for the emergency stop and send the command (e.g., as part of actor information) to the safety controller associated with robotic actor 214.

In response to receiving the command for the emergency stop, the safety controller associated with robotic actor 214 can send a command to robotic actor 214 to stop immediately and/or enter into an emergency stop mode. FIG. 2C depicts robotic actor 214 with a word balloon having text of "Stop" to indicate that robotic actor 214 has entered into the emergency stop mode. In scenario 200, robotic actor 214 has made the emergency stop at the location between areas 111 and 121 indicated in FIG. 2C.

In scenario 200, the smart watch associated with human actor 220 broadcast the actor information that included the command for the emergency stop. This actor information was received by robotic actors 210 and 213. The safety controllers for respective robotic actors 210 and 213 can receive at least the actor information for human actor 220 along with robot information for the respective robotic actors 210 and 213, apply safety criteria to the received information, and determine that respective robotic actors 210 and 213 are in respective high-risk and medium-risk modes. In particular, the safety controllers for respective robotic actors 210 and 213 can receive the command for the emergency stop, as well as at least the remaining actor information and robot information, respectively determine that human actor 220 is somewhat unlikely and very unlikely to come near or in contact with the respective associated robotic actors 210 and 213, and respectively determine that robotic actors 210 and 213 are to be readied for a possible emergency stop by entering into respective high-risk and medium-risk modes. FIG. 2C shows that robotic actor 210 has entered into the high-risk mode and robotic actor 213 has entered into the medium-risk mode.

In other scenarios, actor information for human actor 220 does not indicate an emergency stop is required. However, the safety controller associated with robotic actor 214 can use at least the actor information for human actor 220 and robot information for robotic actor 214; e.g., kinematic information for human actor 220 and/or robotic actor 214 to predict or otherwise determine that a likelihood of collision between human actor 220 and robotic actor 214 is relatively high. Then, the safety controller associated with robotic actor 214 can apply safety criteria based on at least relatively-high likelihood of collision and responsively send one or commands to robotic actor 214 to cause robotic actor 214 to do one or more of the following: change a risk mode of robotic actor 214 (e.g., go into a high-risk or emergency stop mode), change velocity (e.g., slow down and/or change direction), change acceleration (e.g., decelerate gradually or rapidly), make a non-emergency stop (i.e., make a gradual stop), and/or make an emergency stop.

At the stage of scenario 200 shown in FIG. 2C, actor information related to human actors 221 and 222, who have not moved between the stages of scenario 200 shown in FIGS. 2B and 2C, does not cause any of the safety controllers associated with robotic actors 210-219 to change risk modes and/or otherwise send commands to robotic actors 210-219. Also, at the stage of scenario 200 shown in FIG. 2C, safety controllers associated with respective robotic actors 211, 212, 217 can receive information; e.g., robot information from each respective robotic actor, to determine that each respective robotic actor 211, 212, 217 can operate in a (default) low-risk mode; i.e., because safety criteria applied to the received information, such as discussed above in the context of FIG. 2A, do not indicate that each respective robotic actor 211, 212, 217 should operate in another mode; e.g., a medium-risk, high-risk, emergency stop, or other mode.

At the stage of scenario 200 shown in FIG. 2C, actor information for human actor 223 is provided to at least the safety controllers associated with respective robotic actors 215 and 216. The respective safety controllers associated with robotic actors 215 and 216 can apply safety criteria to the actor information for human actor 223 and other received information; e.g., robot information for respective robotic actors 215 and 216. The safety criteria, when applied to the received information, can indicate that human actor 223 is close enough to each respective robotic actor 215 and 216 that a possible collision or other contact with human actor 223 is likely enough to indicate that each respective robotic actor 215 and 216 should operate in a high-risk mode. Then, the respective safety controllers associated with robotic actors 215 and 216 can responsively send one or more commends to respective robotic actors 215 and 216 to cause the respective robotic actors 215 and 216 to do one or more of the following: change a risk mode of the robotic actor (e.g., go into a high-risk mode), change velocity, change acceleration, and stop (e.g., make a non-emergency or an emergency stop).

At the stage of scenario 200 shown in FIG. 2C, actor information for human actors 224 and 225 is provided to at least the safety controllers associated with respective robotic actors 218 and 219. The respective safety controllers associated with robotic actors 218 and 219 can apply safety criteria to the actor information for human actors 224 and 225 and other received information; e.g., robot information for respective robotic actors 218 and 219. The safety criteria, when applied to the received information, can indicate that human actors 224 and/or 225 are close enough to each respective robotic actor 218 and 219 that a possible collision or other contact with human actor 223 is at least somewhat likely.

For robotic actor 218, which is configured with a moving arm that could move toward the human actors, the associated safety controller can determine that a possible collision or other contact between at least a portion (e.g., the moving arm) of robotic actor 218 and at least one human actor (e.g., human actor 225) is likely enough to indicate that that robotic actor 218 should operate in a high-risk mode. For robotic actor 219, which is configured without a moving arm, the associated safety controller can determine that a possible collision or other contact with robotic actor 219 and at least one human actor (e.g., human actor 224 or 225) is likely enough to indicate that that robotic actor 219 should operate in a medium-risk mode.

Then, the respective safety controllers associated with robotic actors 218 and 219 can responsively send one or more commends to respective robotic actors 218 and 219 to cause the respective robotic actors 218 and 219 to respectively do one or more of the following: change a risk mode of the robotic actor; e.g., change a risk-mode of robotic actor 218 to a high-risk mode, change a risk-mode of robotic actor 219 to a medium-risk mode, change velocity, change acceleration, and stop.

After all of the safety controllers, computing devices, robotic actors 210-219 and human actors 220-225 have carried out the activities as discussed above with respect to FIG. 2C, scenario 200 can end. Many other scenarios related to safety controllers, computing devices, robotic actors, and human actors are possible as well.

Figures 3A, 3B:
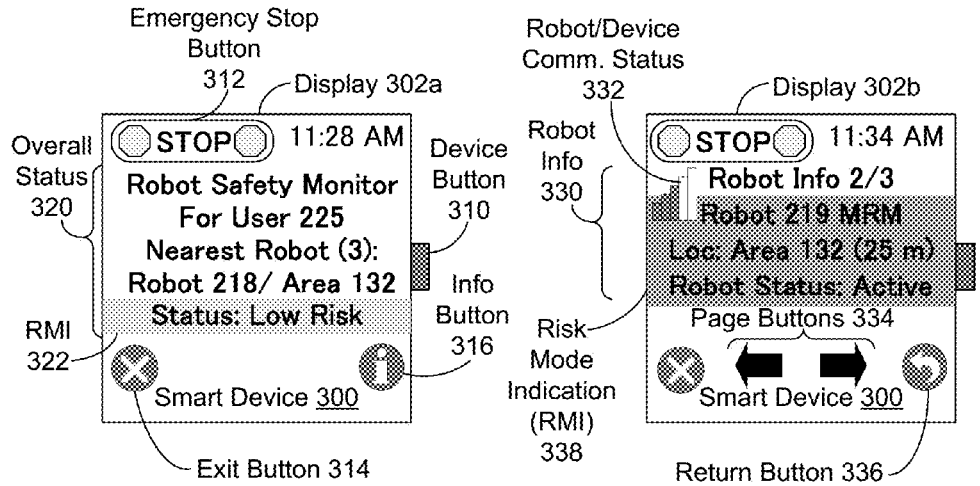
FIGS. 3A and 3B depict robot status displays generated by a smart device, in accordance with an example embodiment.

FIGS. 3A and 3B depict respective robot safety displays 302a, 302b generated by smart device 300, in accordance with an example embodiment. Robot safety displays 302a, 302b can display indicia related to one or more actors as described herein. For example, robot safety displays 302a, 302b can provide indications and/or other information about part or all of a human/robotic environment.

As indicated above, human actors can wear, carry, and/or otherwise be associated with computing devices, such as smart device 300, while in human/robotic environments having both robotic and human actors, such as environment 100 during scenario 200. Some or all of the computing devices associated with human actors in environments having both robotic and human actors can be configured with user interfaces, such as graphical user interfaces, that can provide and/or receive information to associated human actors about actors in human/robotic environments. The user interfaces can provide and/or receive information via at least robot safety displays such as the example displays shown in FIGS. 3A, 3B, and 3C and/or a user interface configured to communicate information about a robot safety profile, such as example user interface 372 shown in FIG. 3D.

The robot status displays 302a, 302b can be generated by a robot-status software application App1 executing on smart device 300. Along with providing robot status displays 302a, 302b, application App1 can communicatively couple with and communicate information (e.g., actor information about at least a human actor wearing smart device 300, information about other actors in or near a human/robotic environment) with one or more safety controllers, robotic actors, and/or other computing devices communicatively coupled with smart device 300.

FIG. 3A shows robot status display 302a generated by smart device 300. Smart device 300 includes a hardware device button 310 and software buttons that include emergency stop button 312, exit button 314, and information (info) button 316, each of which can be pressed by a user of smart device 300. When device button 310 or software emergency stop button 312 is pressed, application App1 and/or other components of smart device 300 can be configured to send one or more commands to make an emergency stop to one or more safety controllers. The command(s) can indicate that robotic actor(s) associated with the safety controller(s) are to immediately stop and can be communicated with or without other information e.g., as part of actor information provided to the safety controller(s). When exit button 314 is pressed, application App1 can exit; that is, stop executing and return control to an operating system or other software directing smart device 300. When information button 316 is pressed, application App1 can change the display of smart device 300 to communicate other and/or additional information about the human/robotic environment; e.g., information about robotic and/or human actors (e.g., provide a display related to nearby robotic actors, such as indicated by display 302b), navigational information about the human/robotic environment, information about smart device 300, profile information associated with the user of smart device 300 (e.g., some or all of the information indicated in FIG. 3D).

In other examples, when device button 310 is pressed while application App1 is executing, application App1 can perform one or other more other actions instead of, or along with, sending command(s) to make an emergency stop, such as changing a display of smart device 300; e.g., display another robot status display such as display 302b, refreshing the display of smart device 300, exiting application App1 without a prompt, and prompting the user (e.g., via a menu or other user interface component) to indicate whether smart device 300 is to perform one or more actions, such as exiting application App1, changing the display of smart device 300 (e.g., to communicate the other and/or additional information discussed above regarding information button 316), and/or sending one or more emergency stop commands.

Display 302a shows information about robotic actors in the human/robotic environment including overall status 320 which can include risk-mode indication (RMI) 322. Overall status 320 can indicate information about a user; e.g., identification information such as "User 225" shown in FIG. 3B. Overall status 320 can indicate information about nearby actors such as "Nearest Robot (3) Robot 238/Area 132" shown in FIG. 3A, which can signal that three "(3)" robotic actors are relatively close to smart device 300 (and thereby close to a user wearing and/or using smart device 300) and the closest robotic actor identified as "Robot 218" is at a location "Area 132".

Risk-mode indication 322 can use one or more indicia to indicate a risk-mode for the displayed robotic actor; that is, risk-mode indication 322 can use text to indicate that "Robot 238" is in a "Low Risk" mode, as shown in FIG. 3A. FIG. 3A also shows that risk-mode indication 322 is displayed using a light gray background color, which can correspond to the indicated low-risk mode. In other examples, a risk-mode indication can use additional and/or other indicia than background colors for corresponding risk or safety modes, such as, but not limited to, indicia using text colors and/or other text formatting indicia (e.g., different fonts, different font styles such as bold, underlining, etc., different font sizes), images and/or other visible indicia, audible indicia, and haptic indicia (e.g., vibrations).

FIG. 3B shows robot status display 302b generated by smart device 300. Robot status display 302b can display detailed information about one (nearby) robotic actor. FIG. 3B shows smart device 300 displaying display 302b with robotic actor information 330, robotic actor communications status 332, page buttons 334, return button 336, risk-mode indication 338, and shows three buttons discussed above in the context of FIG. 3A: a hardware device button and software emergency stop and exit buttons.

Robotic actor information 330 can be displayed by smart device 300 in response to a request for additional information about robotic actors; e.g., in response to detecting a press of device button 310 or information button 316. As shown in FIG. 3B, robotic actor information 330 can include an indication "Robot Info 2/3" about which robotic actor "2" of a number of nearby or other robotic actors "3" is being displayed, an identifier of the robotic actor "Robot 219", a risk mode "MRM" indicating robotic actor "Robot 219" is in a medium-risk mode, a location of the robotic actor "Area 132" that is "25 m" (25 meters) from smart device 300, and an indication of an "Active" status for robotic actor "Robot 219". Other robotic actor information can be displayed by smart device 300 and/or other computing devices as well.

Robotic actor communications status 332 can indicate a strength of a signal received from the robotic actor whose information is displayed by smart device 300. As shown in FIG. 3B, robotic actor communications status 332 uses a bar display to show that a signal received from robotic actor "Robot 219" has a strength of three bars out of a five-bar maximum. Other techniques for displaying communication status; e.g., text indicating a signal strength value (e.g., "−80 dB", "72%", "3/5 bars") can be used as well or instead. Also, other robotic actor communications statuses can be displayed by smart device 300 and/or other computing devices as well.

Page buttons 334 can be used to select a robotic actor for information display. In the example shown in FIG. 3B, a second robotic actor "Robot 219" is selected for display out of a group of three robotic actors that are nearby as indicated by the text "Robot Info 2/3" of robotic actor information 330. FIG. 3B shows that page buttons 334 include a leftward facing arrow button and a rightward facing arrow button, as indicated from the point of view of a viewer of display 302b. A user of smart device 300 can press the leftward facing arrow button to select a previous robotic actor to the second robotic actor "Robot 219"; e.g., a first robotic actor of the group of three robotic actors. The user of smart device 300 can press the rightward facing arrow button to select a next robotic actor to the second robotic actor "Robot 219"; e.g., a third robotic actor of the group of three robotic actors. In other examples, the leftward facing arrow button can select the next robotic actor and the rightward facing arrow button can select the previous robotic actor; that is, the effects of the arrow buttons of page buttons 334 can be reversed. Other user-interface techniques for selecting robotic actors for information display can be used along with or instead of page buttons 334.

Return button 336 can, when pressed, direct smart device 300 to display a previous display; i.e., return to the previous display. For example, the previous display can be display 302a. Risk-mode indication 338 can use one or more indicia to indicate a risk-mode for robotic actor "Robot 219"; in the example shown in FIG. 3B, risk-mode indication 338 involves the text "MRM" and use of a moderate gray background color for robotic actor information 330 to indicate that r robotic actor "Robot 219" is in a medium-risk mode. Other indicia than used by risk-mode indication 338 can be used to indicate a risk-mode, as discussed above in the context of risk-mode indication 322.

Figure 3C:
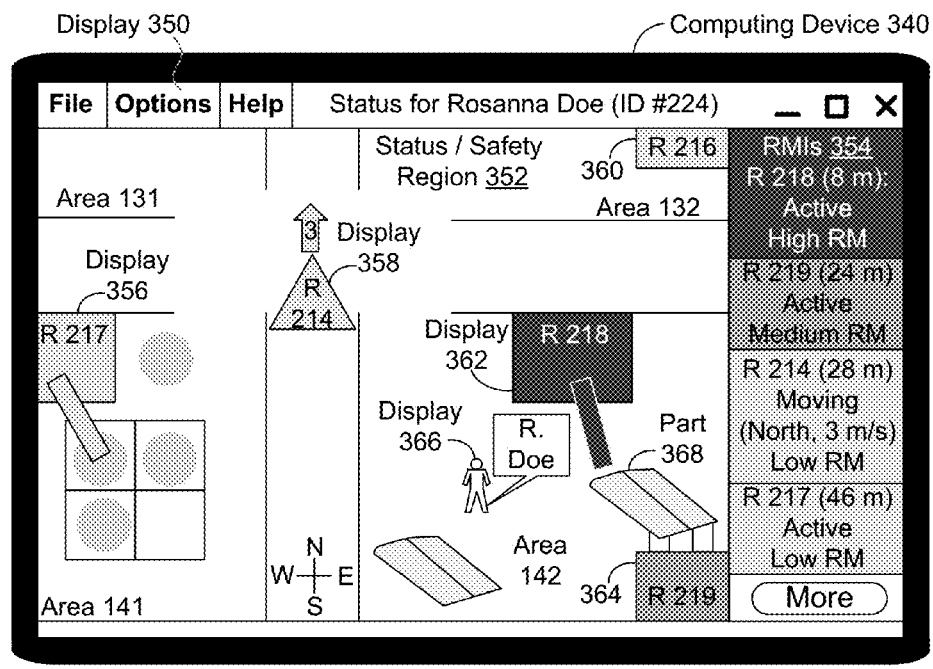
FIG. 3C depicts a human/robotic environmental status display, in accordance with an example embodiment.
Figure 3D:
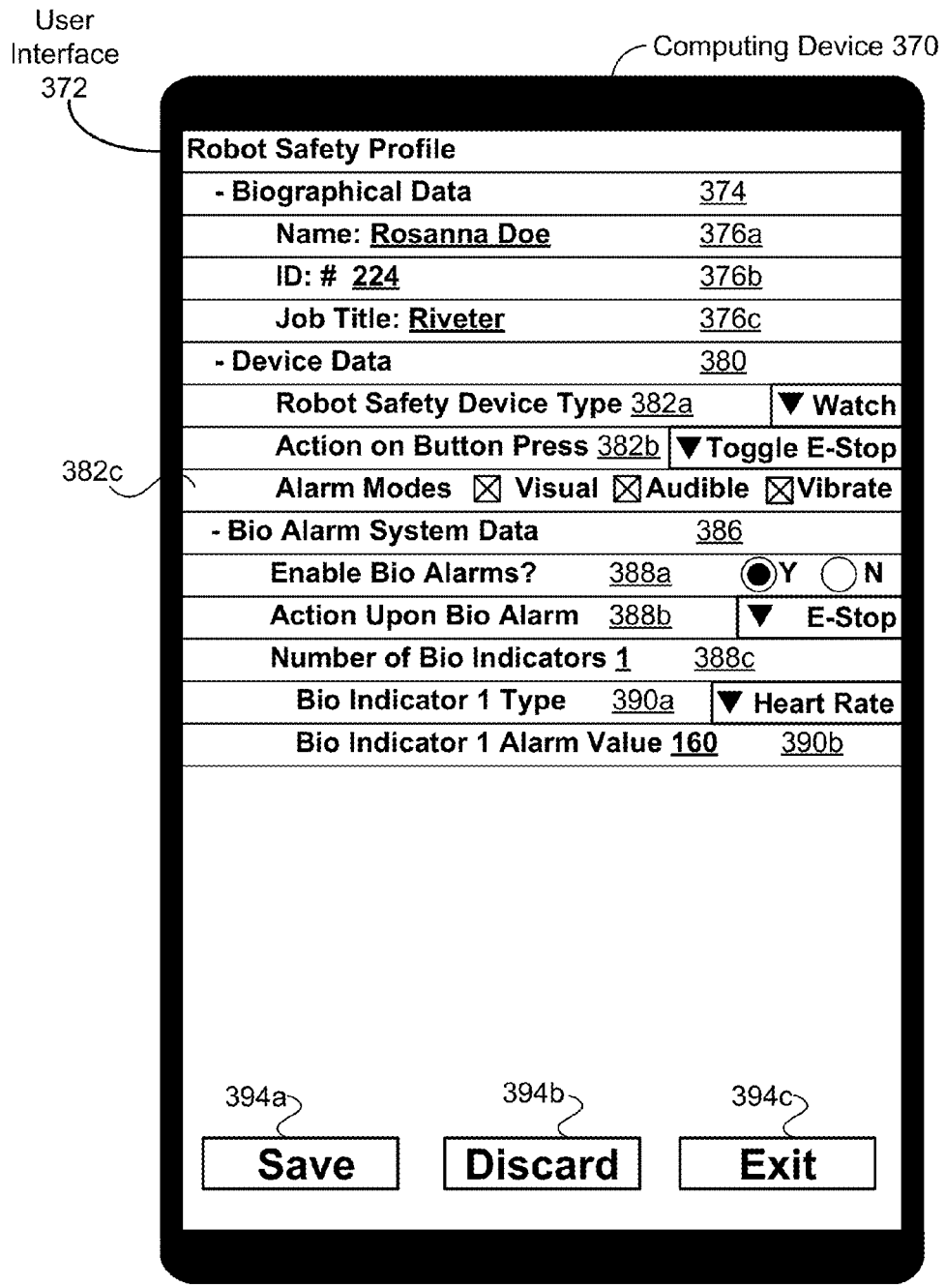
FIG. 3D depicts a user interface for a profile of a robot safety system, in accordance with an example embodiment.

FIG. 3C depicts human/robotic environmental status display 350 displayed by computing device 340, in accordance with an example embodiment. Human/robotic environmental status display 350 can display indicia related to one or more actors as described herein. For example, human/robotic environmental status display 350 can provide indications and/or other information about part or all of a human/robotic environment. In some embodiments, computing device 340 can display human/robotic environmental status display 350 using an output display device discussed below in the context of user interface module 421 depicted in FIG. 4B.

Human/robotic environmental status display 350 can include a menu bar, status/safety region 352, and risk-mode indications 354. The menu bar can be used to provide controls related to display 350 such as "File" controls, specify "Options", provide "Help" related to human/robotic environmental status display 350, to maximize or minimize a size of a window for human/robotic environmental status display 350, and to close human/robotic environmental status display 350. The menu bar can provide information "Status for Rosanna Doe (ID #224)" about a human actor associated with human/robotic environmental status display 350 and/or computing device 340. In other examples, the menu bar can include more, fewer, and/or different controls than shown in FIG. 3C.

Status/safety region 352 can depict part or all of a human/robotic environment, such as environment 100 discussed above in the context of FIGS. 1-2C. As shown in FIG. 3C, status/safety region 352 can show part of an environment that include area 131 shown at upper left of status/safety region 352, area 132 shown at upper right of status/safety region 352, area 141 shown at lower left of status/safety region 352, and area 142 shown at lower right of status/safety region 352.

In particular, safety/status region 352 can provide information about robotic and human actors in the human/robotic environment. For example, display 356 shows robotic actor "R 217" as being located in area 141 and whose arm is positioned over components, shown as grey circles in FIG. 3C, and engaged in a task of moving the components. Display 356 shows robotic actor "R 217" using a relatively-light gray color to indicate that robotic actor "R 217" is operating in a low-risk mode. Display 358 shows mobile robotic actor "R 214" located in a corridor between areas 141 and 142 and includes a directional arrow marked with a "3" to indicate a velocity (direction and speed) of mobile robotic actor "R 214"; e.g, moving northward at 3 meters per second. Display 358 also shows mobile robotic actor "R 214" to indicate operation in a low-risk mode. Display 360 shows robotic actor "R 216" as being located in area 132 and depicted using a relatively-light gray color to indicate that robotic actor "R 216" is operating in a low-risk mode.

Displays 362 and 364 shows respective robotic actors "R 218" and "R 219" as both being located in area 142 and indicating that robotic actors "R 218" and "R 219" are both working on a task involving part 368. Display 362 depicts robotic actor "R 218" using a relatively-dark gray color to indicate that robotic actor "R 218" is operating in a high-risk mode, while display 364 depicts robotic actor "R 219" using a moderately-dark gray color to indicate that robotic actor "R 219" is operating in a medium-risk mode. Other indicia for risk modes than used in displays 356, 358, 360, 362, and 364 can be used to indicate a risk-mode as discussed above in the context of risk-mode indication 322.

Safety/status region 352 also includes display 366 depicting a location of a human actor "R. Doe" in area 142.

Risk mode indicators 354 can provide robot information, including risk mode information, about robotic actors in the human/robotic environment. In the example shown in FIG. 3C, risk mode indicators 354 includes four risk-mode indicators and a "More" button. The four risk-mode indicators include:

A risk-mode indicator displayed in a relatively-dark gray color for robotic actor "R 218", indicating that the robotic actor is "Active" and located 8 meters ("8 m") from human actor "Rosanna Doe" associated with computing device 340 and/or human/robotic environmental status display 350 and is operating in a "High RM" (high-risk mode), A risk-mode indicator displayed in a moderately-dark gray color for robotic actor "R 219", indicating that the robotic actor is "Active" and located 24 meters from human actor "Rosanna Doe" associated with computing device 340 and/or human/robotic environmental status display 350 and is operating in a "Medium RM" (medium-risk mode), A risk-mode indicator displayed in a relatively-light gray color for robotic actor "R 214", indicating that the robotic actor is "Moving" in a direction "North" at a speed of "3 m/s", and is located 28 meters from human actor "Rosanna Doe" associated with computing device 340 and/or human/robotic environmental status display 350 and is operating in a "Low RM" (low-risk mode), and A risk-mode indicator displayed in a relatively-light gray color for robotic actor "R 217", indicating that the robotic actor is "Active" and located 46 meters from human actor "Rosanna Doe" associated with computing device 340 and/or human/robotic environmental status display 350 and is operating in a low-risk mode.

Other indicia than used by risk-mode indications 354 can indicate a risk-mode, as discussed above in the context of risk-mode indication 322.

Risk-mode indications 354 are shown in FIG. 3C as being sorted by distance from the human actor "Rosanna Doe". Other techniques for showing risk-mode indications 354 are possible as well; e.g., filter risk-mode indications 354 to only show risk-mode indicators for robotic actors operating in a particular risk mode or modes, filter risk-mode indications 354 to only show risk-mode indicators for robotic actors operating in a particular area/portion of the human/robotic environment, show risk-mode indicators for all robotic actors in the human/robotic environment, select risk-mode indicators for robotic actors within (or outside) of a threshold distance from a particular human actor.

FIG. 3D depicts a user interface 372 for a profile of a robot safety system displayed by computing device 370, in accordance with an example embodiment. In some embodiments, computing device 370 can provide user interface 372 using user interface module 421 discussed below in the context of FIG. 4B.

User interface 372 can be used to review, update, delete, and/or insert data in the profile of the robot safety system. The data in the profile of the robot safety system can indicate selections of options related to the robot safety system. For example, the data in the profile can indicate selections made by a user U1 of computing device 370 who utilizes computing device 370 while in a human/robotic environment, such as environment 100 discussed above in the context of FIGS. 1-2C.

As shown in FIG. 3D, user interface 372 has three portions for reviewing, updating, deleting, and/or inserting data in the profile of the robot safety system: biographical data portion 374, device data portion 380, and biological alarm system data portion 386. In some examples, more, fewer, and/or different portions of data can be provided by user interface 372. In other examples, more, fewer, and/or different controls can be provided by biographical data portion 374, device data portion 380, and/or biological alarm system data portion 386.

Biographical data portion 374 can include user interface controls for reviewing, updating, deleting, and/or inserting biographical data about the user U1. For example, FIG. 3D shows that biographical data portion 374 includes name control 376a, identifier control 376b, and job title 376c. Name control 376a and identifier control 376b can enable reviewing, updating, deleting, and/or inserting identification information for a human actor associated with computing device 370; in the example shown in FIG. 3D, name control 376a shows a name of "Rosanna Doe" for the human actor associated with computing device 370, and identifier control 376b shows an identifier number (ID) of "224" for the human actor associated with computing device 370. Job title control 376c can enable reviewing, updating, deleting, and/or inserting occupational information for a human actor associated with computing device 370; in the example shown in FIG. 3D, job title control 376c shows a job title of "Riveter" for the human actor associated with computing device 370. Other controls for reviewing, updating, deleting, and/or inserting biographical data, identification information, and/or occupational information for human actors are possible as well.

Device data portion 380 can include user interface controls for reviewing, updating, deleting, and/or inserting device data about computing device 340. For example, FIG. 3D shows that device data portion 380 includes robot safety device type control 382a, action on button press control 382b, and alarm modes control 382c.

Robot safety device type control 382a can enable reviewing, updating, deleting, and/or inserting device type information for a computing device associated with a human actor who can be in the human/robotic environment. In the example shown in FIG. 3D, robot safety device type control 382a uses a pull-down menu control to provide selections for a device type, and the pull-down menu selection chosen is a "Watch" (for smart watch). Other device types; e.g., "Phone" (for smart and/or other mobile phones), "Tablet", "Laptop", "Desktop", may be selected using the pull-down menu control of robot safety device type control 382a. In other embodiments, a different control than a pull-down menu control can be used for robot safety device type control 382a.

Action on button press control 382b can enable reviewing, updating, deleting, and/or inserting information related to an action taken by a computing device associated with a human actor in the human/robotic environment when a designated (hardware) button of the computing device is pressed; e.g., device button 310 of smart device 300. In the example shown in FIG. 3D, action on button press control 382b uses a pull-down menu control to provide selections for the action to be taken, and the pull-down menu selection chosen is a "Toggle E-Stop" (for selecting an action of sending a command that toggles between a command to cause an emergency stop and a command rescinding a previous emergency stop). Other actions; e.g., "E-Stop" (take an action of sending an emergency stop command), "Gradual Stop" (take an action of sending a non-emergency stop command), "Slow Down" (take an action of sending a slow down command), may be selected using the pull-down menu control of action on button press control 382b. In other embodiments, a different control than a pull-down menu control can be used for action on button press control 382b.

Alarm modes control 382c can enable reviewing, updating, deleting, and/or inserting information related to alarms generated by a computing device associated with a human actor in the human/robotic environment; e.g., device button 310 of smart device 300. An alarm can be generated when the computing device is informed of a condition related to one or more robotic devices (e.g., a robotic device being within a threshold distance of the device specified in device data portion 380, a robotic device being in a particular risk/safety mode), one or more conditions that lead to the computing device generating a biological alarm, and/or due to other conditions (e.g., alarms related to meteorological conditions, such as tornadoes or other storms; alarms related to problems within the environment, such as a fire or a flood). In the example shown in FIG. 3D, alarm modes control 382c uses check box controls to provide selections related to techniques for providing alarms and the check box controls shown indicate that "Visible", "Audible", and "Vibrat[ing]" alarms have been selected. In other embodiments, other controls can be used to select types of alarms to be provided by computing device 370.

Biological alarm system data portion 386 can include user interface controls for reviewing, updating, deleting, and/or inserting device data about a biological alarm system of the robot safety system. When activated, the biological alarm system can obtain data about one or more biological indicators of user U1 via the computing device identified using device data portion 380, and use the biological indicator data to generate commands to robotic platforms, such as an emergency stop command generated based on a biological indicator indicating a high-stress level as discussed above in the context of FIG. 2C. For example, FIG. 3D shows that biological alarm system portion 386 includes an enable biological alarms control 388a, action on biological alarms control 388b, number of biological indicators control 388, and controls for each biological indicator including biological indicator type control 390a and biological indicator alarm value control 390b.

Enable biological alarms control 388a can be used to control whether or not biological alarms are enabled (used) for the human actor associated with the computing device identified using device data portion 380; FIG. 3D shows that enable biological alarms control 388a is set to enable biological alarms for this example.

Action on biological alarms control 388b can enable reviewing, updating, deleting, and/or inserting information related to an action taken by a computing device associated with a human actor in the human/robotic environment when a biological alarm is triggered. In the example shown in FIG. 3D, action on biological alarms control 388b uses a pull-down menu control to provide selections for the action to be taken, and the pull-down menu selection chosen is a "E-Stop". Other actions; e.g., "Toggle E-Stop", "Gradual Stop", "Slow Down" may be selected using the pull-down menu control of action on biological alarms control 388b. In other embodiments, a different control than a pull-down menu control can be used for action on biological alarms control 388b.

Number of biological indicators control 388c can enable providing information about how many biological indicators are examined by a computing device in order to provide biological alarms. In the example shown in FIG. 3D, number of biological indicators control 388c is set to 1 indicating that one biological indicator is examined to provide biological alarms.

For each biological indicator indicated by number of biological indicators control 388c, data for the biological indicator can be provided using user interface 372. In the example shown in FIG. 3D, the data for the one biological indicator includes a biological indicator type and an alarm value, where biological indicator 1 type control 390a is set to "Heart Rate" and biological indicator 1 alarm value 390b is set to 160. Biological indicator 1 type control 390a is shown as a pull-down menu control to provide selections for the biological indicator; these selections can include a "Heart Rate" for a heart rate indicator as shown in FIG. 3D, a "Pulse Rate" for a pulse rate indicator, a "Breathing Rate" for a breathing rate indicator, and perhaps other selections. Biological indicator 1 alarm value control 390b can enable reviewing, updating, deleting, and/or inserting a numerical or other type of threshold value related to a biological indicator; in this example, biological indicator 1 alarm value control specifies a minimum heart rate of "160" beats per second. Then, for this example, a biological alarm can be generated by the computing device identified using device data portion 380 when the minimum heart rate value of biological indicator 1 alarm value control 390b is exceeded. Other number, types, and alarm values for biological indicators are possible as well.

As shown in FIG. 3D, user interface 372 also has three buttons 394a, 394b, 394c. Button 394a can be used to save profile data provided using user interface 372, button 394b can be used to discard profile data provided using user interface 372 before the data is saved; i.e., revert to previously saved profile data, and button 394c can be used to exit user interface 372. In some examples, if unsaved profile data has been provided to user interface 372 when button 394c has been pressed, a prompt or other user interface control can be provided to ask a user of user interface 372 whether or not to save the unsaved profile data before exiting user interface 372. In other examples, user interface 372 can have more, fewer, and/or different buttons than buttons 394a, 394b, 394c shown in FIG. 3D.

Example Computing Network

Figure 4A:
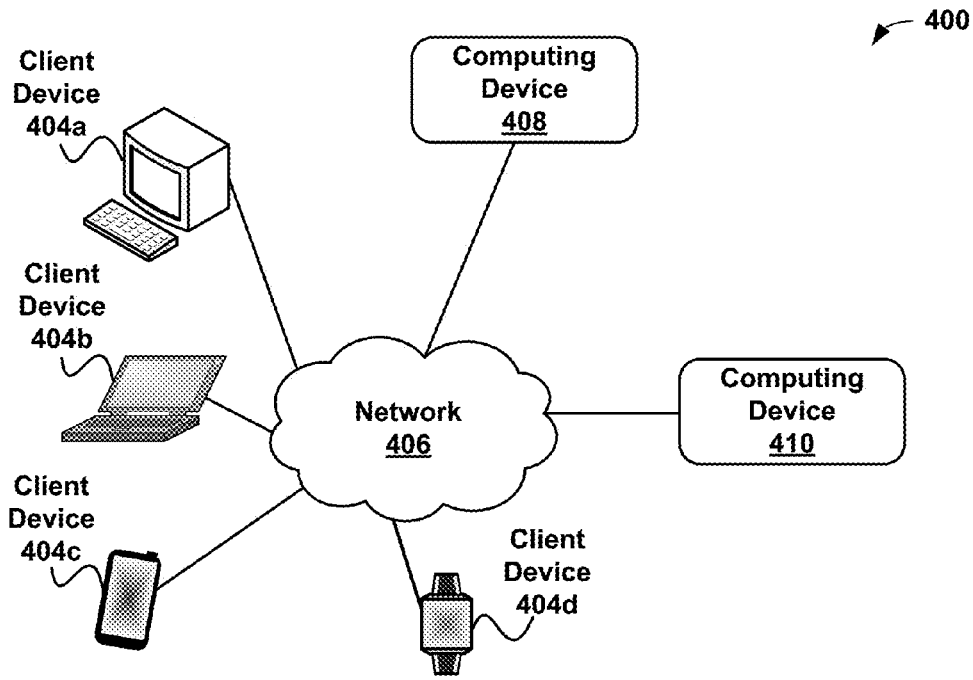
FIG. 4A depicts a computer network, in accordance with an example embodiment.

FIG. 4A depicts computer network 400, in accordance with an example embodiment. In FIG. 4A, computing devices 408 and 410 are configured to communicate, via network 406, with client devices 404a, 404b, 404c, 404c. As shown in FIG. 4A, client devices can include personal computer 404a, laptop computer 404b, smart phone 404c, and smart watch 404d. More generally, client devices 404a-404d (or any additional client devices) can be any sort of computing device, such as a workstation, network terminal, desktop computer, laptop computer, mobile computing device, wireless communication device (e.g., cell phone, smart phone, smart watch), and so on.

Network 406 can correspond to a local area network, a wide area network, a corporate intranet, the public Internet, combinations thereof, or any other type of network(s) configured to provide communication between networked computing devices. Computing devices 408 and 410 can share content and/or provide content to client devices 404a-404d; i.e., act as content servers. As shown in FIG. 4A, computing devices 408 and 410 are not physically at the same location; for example, one or more of computing devices 408 and 410 can be in a remote location and/or be aboard a robotic actor. Alternatively, computing devices 408 and 410 can be co-located, and/or can be accessible via a network separate from network 406. Although FIG. 4A shows three client devices and two computing devices, network 406 can service more or fewer than three client devices and/or more or fewer than two computing devices.

Example Computing Device

Figure 4B:
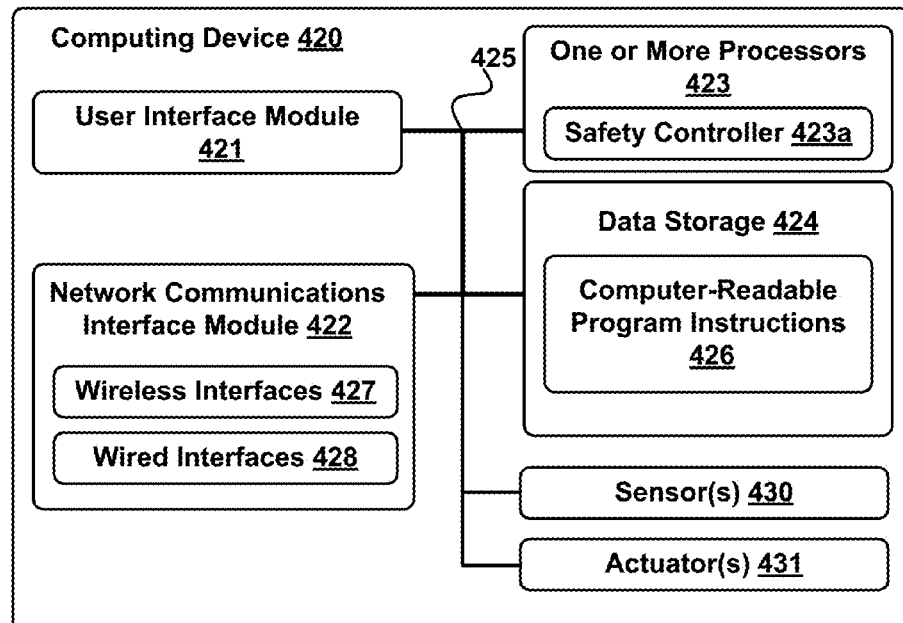
FIG. 4B is a block diagram of a computing device, in accordance with an example embodiment.

FIG. 4B is a block diagram of computing device 420, which can include user interface module 421, network-communication interface module 422, one or more processors 423, data storage 424, sensor(s) 430, and actuator(s) 431, all of which may be linked together via a system bus, network, or other connection mechanism 425, in accordance with an example embodiment. In particular, computing device 420 can be configured to perform one or more functions related to robotic actors 210-219, smart device 300, computing devices 340, 370, displays 302a, 302b, 350, user interface 352, herein-described safety controllers, herein-described robotic actors, herein-described mobile computing devices, herein-described smart watches, and/or to implement part or all of scenario 200 and/or method 500. In some embodiments, computing device 420 can be a mobile or non-mobile computing device, and can be embodied as one or more of: desktop computer, laptop or notebook computer, personal data assistant (PDA), mobile phone, smart phone, smart watch, embedded processor, and/or any similar device that is equipped with at least one processing unit capable of executing machine-language instructions that implement at least part of the herein-described techniques and methods, including but not limited to method 500 described in more detail below with respect to FIG. 5.

User interface 421 can receive input and/or provide output, perhaps to a user. User interface 421 can be configured to send and/or receive data to and/or from user input from input device(s), such as a keyboard, a keypad, a touch screen, a touch pad, a computer mouse, a track ball, a joystick, a game controller, and/or other similar devices configured to receive user input from a user of the computing device 420. User interface 421 can include output display devices, which can include, but are not limited to, one or more: cathode ray tubes (CRTs), liquid crystal displays (LCDs), light emitting diodes (LEDs), displays using digital light processing (DLP) technology, printers, light bulbs, and/or other devices capable of displaying visual outputs (e.g., graphical, textual, and/or numerical information). User interface module 421 can also be configured with one or more devices to generate audible output(s), such as a speaker, speaker jack, audio output port, audio output device, earphones, and/or other similar devices configured to convey sound and/or audible information to a user of computing device 420.

Network-communication interface module 422 can be configured to send and receive data over wireless interfaces 427 and/or wired interfaces 428 via a network, such as network 406. Wireless interface(s) 427 if present, can utilize an air interface, such as a Bluetooth®, ZigBee®, Wi-Fi, and/or WiMAX interface to a data network, such as a WAN, a LAN, one or more public data networks (e.g., the Internet), one or more private data networks, or any combination of public and private data networks. Wired interface(s) 428, if present, can comprise a wire, cable, fiber-optic link and/or similar physical connection to a data network, such as a wide area network (WAN), a local area network (LAN), one or more public data networks, such as the Internet, one or more private data networks, or any combination of such networks.

In some embodiments, network-communication interface module 422 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well as or in addition to those listed herein to secure (and then decrypt/decode) communications.

Processor(s) 423 can include one or more central processing units, computer processors, mobile processors, digital signal processors (DSPs), GPUs, microprocessors, computer chips, programmable processors, multi-core processors, and/or other processing units configured to execute machine-language instructions and process data. Processor(s) 423 can be configured to execute computer-readable program instructions 426 that are contained in data storage 424 and/or other instructions as described herein. In some embodiments, processor(s) 423 can include safety controller 423a, which can include one or more processors utilizing hardware and/or software resources (e.g., executing some or all of computer-readable program instructions 426) to perform the herein-described functionality of a safety controller.

Data storage 424 can include one or more physical and/or non-transitory storage devices, such as read-only memory (ROM), random access memory (RAM), removable disk drives, hard drives, thumb drives, magnetic-tape memory, optical-disk memory, flash memory, volatile storage devices, non-volatile storage devices, and/or other storage devices. Generally, a storage device is hardware that is capable of storing information; for example, data, computer-readable program instructions, and/or other suitable information on a temporary basis and/or a permanent basis. Data storage 424 can include one or more physical and/or non-transitory storage devices with at least enough combined storage capacity to contain computer-readable program instructions 426 and any associated/related data structures. In some embodiments, some or all of data storage 424 can be removable, such as a removable hard drive, removable disk, or flash memory.

Computer-readable program instructions 426 and any data structures contained in data storage 424 include computer-readable program instructions executable by processor(s) 423 and any storage required, respectively, to perform at least part of herein-described scenarios and methods, including but not limited to scenario 200 described above with respect to FIGS. 2A-2C method 500 described below with respect to FIG. 5. Computer-readable program instructions 426 can include instructions that when executed by processor(s) 423 to perform functions, including but not limited to herein-described functionality of software, displays, and/or user interfaces.

In some embodiments, computing device 420 can include one or more sensors 430. Sensor(s) 430 can be configured to measure conditions in an environment around computing device 420 and provide data about the measured conditions of the environment. The data can include, but are not limited to, location data about computing device 420 (including, but not limited to, latitude, longitude, and/or altitude data), other kinematic information related to computing device 420 (e.g., speed, velocity, acceleration data), and other data about the environment around computing device 420, meteorological data about the environment (e.g., air temperature, humidity, barometric pressure, wind speed), and electromagnetic radiation data (e.g., infra-red, ultra-violet, X-ray data). The one or more sensors 430, can include, but are not limited to, one or more: Global Positioning System (GPS) sensors, location sensors, gyroscopes, accelerometers, magnetometers, video and/or still cameras, light sensors, infrared sensors, ultraviolet sensors, X-ray sensors, meteorological sensors, proximity sensors, vibration and/or motion sensors, heat sensors, thermometers, lasers, and microphones. Other examples of sensor(s) 430 are possible as well.

In some embodiments, computing device 420 can include one or more actuators 431. Actuator(s) 431 can enable computing device 420 to initiate movement. For example, actuator(s) 431 can include or be incorporated with robotic joints connecting robotic limbs to a robotic body, such as an arm of robotic actor 211, 215, 217, or 218 discussed above in the context of FIGS. 2A-2C. Further, actuator(s) 431 can include respective robotic joints connecting respective portions of the robotic limbs (e.g., robotic knees and/or ankles for robotic legs; robotic elbows and/or wrists for robotic arms), as well as robotic hands for grasping, turning, and otherwise working with objects. Additionally, actuator(s) 431 can include one or more wheels or tracks enabling computing device 420 to move. In other examples, actuator(s) 431 can be configured as, attach to, and/or utilize one or more tools, such as, but not limited to, tongs, pliers, winches, wrenches, hammers, screwdrivers, knives, saws, drills, and/or lasers, by utilizing the robotic hands to control the tool(s) and/or as a replacement for robotic hands and/or limbs. In addition, actuator(s) 431 can include motors for moving the robotic joints, robotic limbs, wheels and/or tracks. Other examples of actuator(s) 431 are possible as well.

Other components shown in FIG. 4B can be varied from the illustrative examples shown. Generally, the different embodiments can be implemented using any hardware device or system capable of running program code.

Operational Methods

Figure 5:
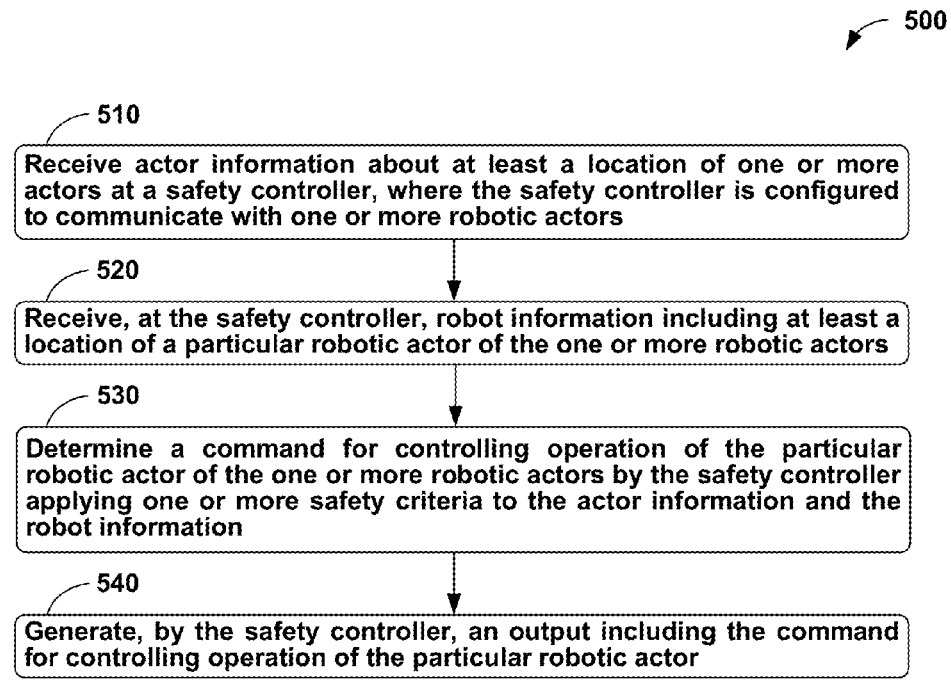
FIG. 5 is a flowchart of a method, in accordance with an example embodiment.

FIG. 5 is a flowchart of method 500, in accordance with an example embodiment. Method 500 can be carried out by a computing device, such as computing device 420, that is configured to act at least as a safety controller.

Method 500 can begin at block 510, where a safety controller that is configured to communicate with one or more robotic actors can receive actor information about at least a location of one or more actors. The actor(s) can include one or more human and/or robotic actors, such as discussed above in the context of at least FIGS. 2A-2C.

At block 520, the safety controller can receive robot information that includes a location of a particular robotic actor of the one or more robotic actors, such as discussed above in the context of at least FIGS. 2A-2C. In some embodiments, other information can be part of the robot information as well, such as, but not limited to, information identifying the particular robotic actor, kinematic information in addition to a location (e.g., velocities and/or accelerations of the particular robotic actor), operating status information, information about tasks/roles performed by the particular robotic actor, and information about other (nearby) robotic and/or human actors.

At block 530, the safety controller can determine a command for controlling operation of the particular robotic actor of the one or more robotic actors by applying one or more safety criteria to the actor information and the robot information, such as discussed above in the context of at least FIGS. 2A-2C. In some embodiments, the safety criteria can include criteria related to a difference between the location of the one or more actors and the location of the particular robotic actor; e.g., a high-safety criterion indicating a high-safety mode when the difference is less than a high-safety distance, a medium-safety criterion indicating a medium-safety mode when the difference is more than the high-safety distance but less than a medium-safety distance. In other embodiments, the safety criteria can include criteria related to a role or task performed by the particular robotic actor; e.g., a high-safety criterion indicating a high-safety mode when the particular robotic actor is performing a high-risk activity and/or performing a high-risk role, such as working with dangerous materials, working in high-risk environments, performing in extreme conditions (e.g., high or low temperature), a medium-safety criterion indicating a medium-safety mode when the performing a medium-risk activity and/or performing a medium-risk role. In some embodiments, a default criterion can indicate that the particular robotic actor is in a low-risk mode.

In even other embodiments, the command for controlling operation of the particular robotic actor can include one or more of: a command to switch the particular robotic actor into a particular safety mode, a command to start the particular robotic actor, a command to stop the particular robotic actor, a command to reduce a speed of the particular robotic actor, a command to increase the speed of the particular robotic actor, and a command to change a direction of movement of at least a portion of the particular robotic actor.

In particular of the even other embodiments, the command to switch the particular robotic actor into a particular safety mode can include one or more of: a command to switch the particular robotic actor into a high-safety mode, a command to switch the particular robotic actor into a medium-safety mode, and a command to switch the particular robotic actor into a low-safety mode. Other designations of safety modes are possible as well; e.g., numerical scales of safety modes, alphabetic indicators/grades for safety modes.

In some other embodiments, while in the high-safety mode, the particular robotic actor can be either stopped or restricted, such as being restricted by range of movement, restricted in speed of movement, restricted by a role that can performed, restricted to only utilize a subset of actuators of the particular robotic actor. In yet other embodiments, similar, albeit less prohibitory, restrictions can be placed on the particular robotic actor while in a medium-safety mode and/or a low-safety mode. In some scenarios, minimal or no restrictions can be placed on the particular robotic actor while in the low-safety mode; e.g., the particular robotic actor can operate at a maximum allowable speed within the environment, perform any role, and/or move without restriction while in the low-safety mode. Many other examples of changing, restricting, and/or otherwise controlling robotic behavior based on safety modes are possible as well.

In further embodiments, if the particular robotic actor has actuators including two or more robotic arms, one or more of the robotic arms can be stopped, restricted to a range of movement in one or more dimensions (i.e., only move in one dimension such as an X, Y, or Z dimension, on an particular two-dimensional plane, only move within a predetermined range of motions, such as within an arc, of the two-dimensional plane), restricted from moving a total distance or otherwise restricted in motion. As an example, if the particular robotic actor is mobile and has a movable robotic welding device as an actuator, a welding torch of the robotic welding device can be stopped while in the high-safety mode, the robotic welding device can be stopped from moving while the high-safety mode, stopped from performing welding tasks and/or acting an welding role, and/or the particular robotic actor can be stopped, slowed, or restricted to range(s) of movement while in the high-safety mode. In yet other embodiments, the command to change the direction of movement can include one or more commands to: change movement of the entire particular robotic actor and a command to change movement of one or more actuators of the particular robotic actor.

In yet even other embodiments, the command for controlling operation of the particular robotic actor can be determined by: determining an actor position based on the actor information, where the actor position includes at least one of a location, velocity, and acceleration of one or more actors; determining a robot position based on the robot information, where the robot position comprises at least one of a location, velocity, and acceleration of the particular robotic actor; and determining the command for controlling operation of the particular robotic actor by applying one or more safety criteria to the actor position and the robotic position. In particular of these embodiments, determining the command for controlling operation of the particular robotic actor by applying one or more safety criteria to the actor position and the robotic position can include: determining a difference between the actor position and the robotic position; determining whether the difference is less than a medium-risk threshold; after determining that the difference is less than the medium-risk threshold, determining whether the difference is less than a high-risk threshold; and after determining that the different is less than the high-risk threshold, determining that the command for controlling operation of the particular robotic actor includes a command to switch the particular robotic actor into a high-safety mode. Other techniques for determining commands for robotic actors are possible as well.

In even other embodiments, determining the command for controlling operation of the particular robotic actor can include: determining an actor status based on the actor information, where the actor status can include information about a biological indicator of the one or more actors; and determining the command for controlling operation of the particular robotic actor by applying one or more safety criteria to the actor status. In particular, determining the command for controlling operation of the particular robotic actor by applying one or more safety criteria to the actor status can include: determining whether the information about the biological indicator indicates a high-stress level for the one or more actors; and after determining that the information about the biological indicator indicates a high-stress level for the one or more actors, determining that the command for controlling operation of the particular robotic actor comprises a command to switch the particular robotic actor into a high-safety mode. For example, if the information about the biological indicator indicates a human actor has a heart rate that exceeds a threshold high-heart-rate value, then the information about the biological indicator can indicate the high-stress level. Further, if that the information about the biological indicator indicates a medium (or low) stress level for the one or more actors, then the command for controlling operation of the particular robotic actor can include a command to switch the particular robotic actor into a medium (or low) safety mode.

At block 540, the safety controller can generate an output that includes the command for controlling operation of the particular robotic actor, such as discussed above in the context of at least FIGS. 2A-2C. In some embodiments, the safety controller can send the command to the particular robotic actor. In other embodiments, the safety controller can send the command to other actors, such as to the human actors; e.g., to update a display of robotic actor status, as an acknowledgement of a request to the safety controller for the command, and/or to other robotic actors; e.g., to inform the other robotic actors of the status of the particular robotic actor.

In still other embodiments, the safety controller can send and/or receive information, such as actor and/or robot information, via a wireless communication interface that is coupled to the safety controller. For example, the safety controller can use the wireless communication interface to wirelessly communicate with one or more mobile computing devices carried, worn, and/or otherwise associated with one or more human and/or robotic actors.

In even other embodiments, the actor information can include a request to stop the particular robotic actor. For example, such as in an emergency (or other) scenario, a human actor wearing a mobile computing device, such as a smart watch, can press a button or otherwise signal the mobile computing device to send a request to stop the particular robotic actor. The request can be sent from the mobile computing device to a safety controller for the particular robotic actor, where the safety controller can consequently generate a command to stop the particular robotic actor and send the command to the particular robotic actor. Then, the particular robotic actor can stop, perhaps until the safety controller receives another signal/request to start (restart) the particular robotic actor; e.g., from the human actor and/or the mobile computing device worn by the human actor.

In some embodiments, method 500 can include generating a display of indicia related to the one or more actors based on the actor information and the robot information, such as discussed above in the context of at least FIGS. 3A-3C.

Disclosed embodiments are described above with reference to the accompanying drawings, in which some, but not all of the disclosed embodiments may be shown. Indeed, several different embodiments may be described and should not be construed as limited to the embodiments set forth herein. Rather, these embodiments are described so that this disclosure are thorough and complete and convey the disclosure at least to those skilled in the art.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent from the foregoing descriptions. Such modifications and variations are intended to fall within the scope of the appended claims.

It should be understood that for the processes and methods disclosed herein, flowcharts show functionality and operation of possible implementations of respective embodiments. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in the disclosed flowcharts may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method, comprising:
    receiving actor information comprising at least a location of a first human actor at a safety controller of a first robotic actor, the actor information received from a second robotic actor;
    determining an actor status based on the actor information, wherein the actor status comprises information about a biological indicator of the first human actor, the information about a biological indicator including information about one or more of: a heart rate of the first human actor and a respiration rate of the first human actor;
    receiving, at the safety controller, robot information comprising at least a location of the first robotic actor;
    determining a command for controlling operation of the first robotic actor by the safety controller applying one or more safety criteria to the actor information, the actor status, and the robot information; and
    generating, by the safety controller, an output including the command for controlling operation of the first robotic actor.

2. The method of claim 1, wherein the command for controlling operation of the first robotic actor comprises one or more of:
    a command to switch the first robotic actor into a particular safety mode,
    a command to start the first robotic actor,
    a command to stop the first robotic actor,
    a command to reduce a speed of the first robotic actor,
    a command to increase the speed of the first robotic actor, and
    a command to change a direction of movement of at least a portion of the first robotic actor.

3. The method of claim 2, wherein the command to change the direction of movement comprises one or more of:
    a command to change movement of the entire first robotic actor, and
    a command to change movement of one or more actuators of the first robotic actor.

4. The method of claim 1, wherein receiving the actor information comprises receiving the actor information via a wireless communication interface coupled to the safety controller.

5. The method of claim 4, wherein the actor information comprises a request sent by the first human actor to stop the first robotic actor.

6. The method of claim 1, wherein determining the command for controlling operation of the first robotic actor comprises:
    determining an actor position based on the actor information, wherein the actor position comprises at least one of a location, velocity, and acceleration for at least one actor;
    determining a robot position based on the robot information, wherein the robot position comprises at least one of a location, velocity, and acceleration for the first robotic actor; and
    determining the command for controlling operation of the first robotic actor by applying one or more safety criteria to the actor position and the robotic position.

7. The method of claim 6, wherein determining the command for controlling operation of the first robotic actor by applying one or more safety criteria to the actor position and the robotic position comprises:
    determining a difference between the actor position and the robotic position;
    determining whether the difference is less than a medium-risk threshold;
    after determining that the difference is less than the medium-risk threshold, determining whether the difference is less than a high-risk threshold; and
    after determining that the difference is less than the high-risk threshold, determining that the command for controlling operation of the first robotic actor comprises a command to switch the first robotic actor into a high-safety mode.

8. The method of claim 1, further comprising:
    generating a robot safety display related to the first robotic actor on a mobile computing device utilized by the first human actor, the robot safety display including a location of the first robotic actor, information about a risk mode for the first robotic actor, and a stop button that, when activated, sends a command to the safety controller to stop the first robotic actor.

9. The method of claim 1, wherein determining the command for controlling operation of the first robotic actor by applying one or more safety criteria to the actor status comprises:
    determining whether the information about the biological indicator indicates a high-stress level for the first human actor; and
    after determining that the information about the biological indicator indicates a high-stress level for the first human actor, determining that the command for controlling operation of the first robotic actor comprises a command to switch the first robotic actor into a high-safety mode.

10. The method of claim 1, further comprising:
    generating a display of indicia related to at least the second robotic actor based on the actor information and the robot information on a mobile computing device utilized by the first human actor.

11. A safety controller of a first robotic actor, comprising:
    a processor in communication with at least a second robotic actor, the processor configured to receive actor information comprising at least a location of a first human actor from the second robotic actor; and
    data storage, storing instructions that, upon execution by the processor, cause the safety controller to perform safety-controller functions comprising:
        determining an actor status based on the actor information, wherein the actor status comprises information about a biological indicator of the first human actor, the information about a biological indicator including information about one or more of: a heart rate of the first human actor and a respiration rate of the first human actor;
        receiving robot information comprising at least a location of the first robotic actor;
        determining a command for controlling operation of the first robotic actor by applying one or more safety criteria to the actor information, the actor status, and the robot information; and
        generating an output including the command for controlling operation of the first robotic actor.

12. The safety controller of claim 11, wherein the command for controlling operation of the first robotic actor comprises one or more of:
    a command to switch the first robotic actor into a particular safety mode,
    a command to start the first robotic actor,
    a command to stop the first robotic actor,
    a command to reduce a speed of the first robotic actor, a command to increase the speed of the first robotic actor, and a command to change a direction of movement of at least a portion of the first robotic actor.

13. The safety controller of claim 12, wherein the command to change the direction of movement comprises one or more of:
    a command to change movement of the entire first robotic actor, and
    a command to change movement of one or more actuators of the first robotic actor.

14. The safety controller of claim 11, further comprising a wireless communications interface, and wherein receiving the actor information comprises receiving the actor information via the wireless communication interface coupled to the safety controller.

15. The safety controller of claim 11, wherein the actor information comprises a request sent by the first human actor to stop the first robotic actor.

16. The safety controller of claim 11, wherein determining the command for controlling operation of the first robotic actor comprises:
    determining an actor position based on the actor information, wherein the actor position comprises at least one of a location, velocity, and acceleration for at least one actor;
    determining a robot position based on the robot information, wherein the robot position comprises at least one of a location, velocity, and acceleration for the first robotic actor; and
    determining the command for controlling operation of the first robotic actor by applying one or more safety criteria to the actor position and the robotic position.

17. The safety controller of claim 16, wherein determining the command for controlling operation of the first robotic actor by applying one or more safety criteria to the actor position and the robotic position comprises:
    determining a difference between the actor position and the robotic position;
    determining whether the difference is less than a medium-risk threshold;
    after determining that the difference is less than the medium-risk threshold, determining whether the difference is less than a high-risk threshold; and
    after determining that the different is less than the high-risk threshold, determining that the command for controlling operation of the first robotic actor comprises a command to switch the first robotic actor into a high-safety mode.

18. The safety controller of claim 11, wherein the safety-controller functions further comprise receiving a command to stop the first robotic actor, the command sent from a mobile computing device utilized by the first human actor after a stop button of the mobile computing device utilized by the first human actor was pressed.

19. The safety controller of claim 18, wherein determining the command for controlling operation of the first robotic actor by applying one or more safety criteria to the actor status comprises:
    determining whether the information about the biological indicator indicates a high-stress level for the first human actor; and
    after determining that the information about the biological indicator indicates a high-stress level for the first human actor, determining that the command for controlling operation of the first robotic actor comprises a command to switch the first robotic actor into a high-safety mode.

20. An article of manufacture, comprising a non-transitory computer-readable storage medium storing instructions that, upon execution by a processor of a safety controller of a first robotic actor, cause the safety controller to perform functions comprising:
    receiving actor information comprising at least a location of a first human actor, the actor information received from a second robotic actor;
    determining an actor status based on the actor information, wherein the actor status comprises information about a biological indicator of the first human actor, the information about a biological indicator including information about one or more of: a heart rate of the first human actor and a respiration rate of the first human actor;
    receiving robot information at least a location of the first robotic actor;
    determining a command for controlling operation of the first robotic actor of the one or more robotic actors by applying one or more safety criteria to the actor information, the actor status, and the robot information; and
    generating an output including the command for controlling operation of the first robotic actor.

\* \* \* \* \*